United States Patent Office 2,699,377
Patented Jan. 11, 1955

2,699,377

PRODUCTION OF POTASSIUM HYDROXIDE

William B. Dancy and Albert Adams, Carlsbad, N. Mex., assignors to International Minerals & Chemical Corporation, a corporation of New York No Drawing. Application August 14, 1953,
Serial No. 374,438

11 Claims. (Cl. 23—184)

The instant invention relates to processes for the production of potassium hydroxide. More particularly, it relates to improvements in purifying potassium hydroxide solutions containing potassium chloride and other impurities.

Potassium hydroxide is produced by the electrolysis of an aqueous solution of potassium chloride, and potassium chloride is the major impurity although various other impurities, such as carbonates, iron and silica also contaminate the product. Potassium hydroxide from the electrolytic cells is concentrated by evaporation, and a major portion of the potassium chloride impurity crystallizes and is separated from the solution, for example by filtration. This potassium hydroxide solution contains about 55% potassium hydroxide and between about 0.2% and about 0.4% chlorine. It is either sold in the impure form or additional potassium chloride is removed by physical separation or recrystallization. The small amount of the potassium chloride remaining in the potassium hydroxide is difficult to remove because the solubility characteristics of potassium chloride and potassium hydroxide in water are similar. They both increase in solubility at elevated temperatures so that separation by fractional crystallization is extremely difficult.

One method of further purifying the potassium hydroxide containing potassium chloride involves subjecting the solution to electrolysis which results in the conversion of the chlorine compounds present in the solution to an insoluble form. The insoluble solids are separated from the solution. This method is described and claimed in U. S. Patent 2,270,076, issued to Ladd. U. S. Patent 2,363,066 issued to Ladd describes another method of purifying the potassium hydroxide solution and involves a gravity separation of the potassium chloride and the potassium hydroxide. However, these additional processing steps are complex and increase the cost of production of the potassium hydroxide substantially.

It is an object of the instant invention to provide an improved process for the production of potassium hydroxide.

It is a further object of the instant invention to provide an improved process for the separation of potassium chloride and other impurities from potassium hydroxide produced in electrolytic processes.

It is a further object of the instant invention to provide processes for the separation of potassium chloride from potassium hydroxide by froth flotation.

These and other objects of the instant invention will become more apparent upon a fuller understanding of the invention as hereinafter set forth.

The instant invention involves the purification of potassium hydroxide by froth flotation. Potassium chloride and other impurities present in potassium hydroxide produced by the electrolysis of potassium chloride are separated by crystallizing potassium hydroxide as the dihydrate at a temperature between about 32° C. and the eutectic point of the mixture, and separating potassium chloride from the potassium hydroxide dihydrate by flotation under conditions as herein described.

In carrying out the instant invention, the impure potassium hydroxide solution produced by the electrolytic process is concentrated, for example by evaporation, to such point that at a temperature between about 45° C. and about 55° C. the solution is substantially saturated with respect to potassium hydroxide monohydrate which is the stable form of potassium hydroxide at temperatures above 32° C. Solid potassium chloride crystallizes from the solution and is separated at a temperature between about 45° C. and about 55° C. The resulting potassium hydroxide solution which contains dissolved potassium chloride and other impurities is cooled under carefully controlled conditions to a temperature between about 32° C. and the eutectic point of the mixture, and impure potassium hydroxide dihydrate is crystallized therefrom.

Crystallization of potassium hydroxide is controlled to yield the potassium hydroxide dihydrate form because the monohydrate cannot be separated from potassium chloride by froth flotation. It has been discovered that potassium chloride is separated by flotation if the potassium hydroxide is crystallized in the form of the dihydrate which is obtained at a temperature below about 32° C. In order to obtain a pure potassium hydroxide product, crystallization of the potassium hydroxide dihydrate is controlled in order to minimize crystallization or occlusion of potassium chloride on the potassium hydroxide dihydrate crystals. Generally, the dihydrate crystals are formed by slowly cooling the saturated potassium hydroxide solution to a temperature between about 32° C. and the eutectic point of the mixture, preferably for economic reasons to between about 28° C. and about 32° C. Alternately the saturated potassium hydroxide solution is slowly admixed with a slurry of potassium hydroxide dihydrate crystals maintained at temperatures as above stated. The potassium hydroxide solution is added to said slurry at such rate that the temperature of the resulting slurry does not exceed about 32° C. The resulting slurry contains crystallized potassium hydroxide dihydrate and potassium chloride, and various dissolved impurities.

The slurry containing crude potassium hydroxide dihydrate is reagentized with a cationic reagent which has an affinity for the potassium chloride present. For example, a cationic reagent of the type described in U. S. Patent 2,088,325, issued to Kirby, and in U. S. Patent 2,132,902 issued to Lenher, that is, a straight chain aliphatic amine or a water soluble acid addition salt thereof containing at least one alkyl group having between about 7 and 22 carbon atoms per molecule or a mixture of these compounds is used as the flotation reagent. The slurry containing the crude potassium hydroxide dihydrate and having a solids density of between about 25% and about 60% is generally conditioned with a solution of the collector reagent in an amount between about .05 and about 0.5 pound of collector reagent per ton of slurry, depending upon the particular collector reagent employed. Unlike conventional processes in which potassium chloride is separated from ore containing it, such as sylvinite, the amine collector reagent should not be added to the potassium dihydrate slurry as a water solution because a reaction occurs and a hard soap is formed which prevents flotation of potassium chloride. In practicing the instant invention the amine collector is added in the form of a solution containing sufficient water-miscible alcohol or a mixture thereof to prevent formation of soap. Water-miscible alcohols or mixtures thereof, such as ethanol, methanol, butanol, or a mixture of methanol and ethanol, methanol and butanol, ethanol and butanol, or methanol, ethanol and butanol are employed. The solution contains generally between about 5% and about 80% alcohol. In a preferred embodiment of the invention about six parts of a 5% aqueous solution of the amine collector reagent and about four parts of methanol are combined, and the resulting solution is employed as the solution of the flotation collector reagent. In a typical embodiment between about 0.4 and about 5.0 parts of the solution of the collector reagent containing methanol is added per thousand parts of the slurry containing potassium hydroxide dihydrate.

The resulting reagentized pulp is conditioned by agitation with the reagent for a suitable length of time. Generally, between about twenty seconds and about ten minutes agitation is sufficient depending upon the thoroughness of the mixing. After the pulp has been conditioned, it is subjected to froth flotation in a conventional flotation machine. Potassium chloride impurity is removed with the froth, and the purified potassium hydroxide is collected as the non-floated portion. The non-floated portion containing the purified potassium hydroxide crystals analyzes between about 58% and about 62% potassium hydroxide and contain about 0.05% potassium chloride or less.

As specific examples of the process, the following serve merely as illustration, but it is not intended that the scope of the invention be limited thereto.

*Example I*

About 1500 grams of liquor, saturated with respect to potassium hydroxide monohydrate at about 46° C. and containing about 0.36% chlorine in the form of potassium chloride, was added to about 500 grams of a slurry saturated with respect to potassium hydroxide and containing about 3 grams of solid phase potassium hydroxide dihydrate. The temperature of the slurry during the addition was held at between about 29° C. and about 30° C. About two hours were required to complete the addition of the potassium hydroxide solution. About 5 milliliters of a solution containing an amine collector reagent were added to the slurry containing crystallized potassium hydroxide dihydrate. The solution containing the amine collector was prepared by combining six parts of solution containing about 5% amine reagent in water and four parts of methanol. The amine collector reagent used consisted of about 50% of a mixture analyzing approximately 30% hexadecylamine acetate, 25% octadecylamine acetate, and 45% octadecenylamine acetate, and 50% of a mixture analyzing approximately 25% hexadecylamine acetate, 70% octadecylamine acetate, and 5% octadecenylamine acetate.

The reagentized slurry was conditioned by agitation for about five minutes, and the conditioned slurry was placed in a Fagergren flotation machine. The potassium chloride was removed in the froth, and the non-floated portion containing the potassium hydroxide was recovered, filtered, and washed to remove the liquor. The non-floated portion analyzed about 61.5% potassium hydroxide and about 0.04% potassium chloride.

*Example II*

About 1500 grams of liquor saturated with respect to potassium hydroxide monohydrate at about 46° C., and containing about 0.36% chlorine in the form of potassium chloride, was added to about 500 grams of a slurry saturated with respect to potassium hydroxide and containing about 3 grams of solid phase potassium hydroxide dihydrate. The temperature of the slurry during the addition was held at between about 29° C. and about 32° C. About two hours were required to complete the addition of the potassium hydroxide solution. About 5 milliliters of a solution containing an amine collector reagent was added to the slurry containing crystallized potassium hydroxide dihydrate. The solution containing the amine collector was prepared by combining six parts of solution containing about 5% amine reagent in water and four parts of ethanol. The amine collector reagent used contained about 50% of a mixture analyzing approximately 30% hexadecylamine acetate, 25% octadecylamine acetate and 45% octadecenylamine acetate; and about 50% of a mixture analyzing approximately 25% hexadecylamine acetate, 70% octadecylamine acetate, and 5% octadecenylamine acetate.

The reagentized slurry was conditioned for about five minutes, and the conditioned slurry was placed in a Fagergren flotation machine. The potassium chloride was removed in the froth, and the non-floated portion containing the potassium hydroxide was recovered, filtered and washed to remove the liquor. The non-floated portion analyzed about 61.5% potassium hydroxide and about 0.04% potassium chloride; the remainder was combined with the potassium hydroxide as water of crystallization.

Having thus fully described and illustrated the character of the invention, what is desired to be secured and claimed by Letters Patent is:

1. A process for the purification of potassium hydroxide containing potassium chloride as impurity which comprises preparing a slurry of potassium hydroxide as the dihydrate, reagentizing the potassium hydroxide dihydrate slurry with a collecting agent selected from the group consisting of primary aliphatic amines containing a straight chain hydrocarbon group having between 7 and 22 carbon atoms and their water soluble acid addition salts dissolved in an aqueous water-miscible alcohol solution, conditioning the reagentized slurry, subjecting the conditioned slurry to froth flotation, and recovering the non-floated fraction containing purified potassium hydroxide.

2. A process for the purification of potassium hydroxide containing potassium chloride as impurity which comprises preparing a slurry of potassium hydroxide dihydrate, reagentizing the potassium hydroxide dihydrate slurry with an aqueous solution containing a collecting agent selected from the group consisting of primary aliphatic amines containing a straight chain hydrocarbon group having between 7 and 22 carbon atoms and their water soluble acid addition salts and between about 5.0% and about 80.0% by weight of a water-miscible alcohol, conditioning the reagentized slurry, subjecting the conditioned slurry to froth flotation, and recovering the non-floated fraction containing purified potassium hydroxide.

3. A process for the purification of potassium hydroxide containing potassium chloride as impurity which comprises preparing a saturated solution of the potassium hydroxide at a temperature between about 45° C. and about 55° C., separating insoluble potassium chloride from said solution at a temperature between about 45° C. and about 55° C., crystallizing potassium hydroxide dihydrate from the resulting solution at a temperature between about 28° C. and about 32° C., reagentizing the resulting potassium hydroxide dihydrate slurry with an aqueous methanol solution of a collecting agent selected from the group consisting of primary aliphatic amines containing a straight chain hydrocarbon group having between 7 and 22 carbon atoms and their water soluble acid addition salts, conditioning the resulting reagentized slurry, subjecting the conditioned slurry to froth flotation, and recovering the non-floated fraction containing purified potassium hydroxide.

4. A process for the purification of potassium hydroxide containing potassium chloride as impurity which comprises preparing a saturated solution of the potassium hydroxide at a temperature between about 45° C. and about 55° C., separating insoluble potassium chloride from said solution at a temperature between about 45° C. and about 55° C., crystallizing potassium hydroxide dihydrate from the resulting solution at a temperature between about 28° C. and about 32° C., reagentizing the resulting potassium hydroxide dihydrate slurry with an aqueous ethanol solution of a collecting agent selected from the group consisting of primary aliphatic amines containing a straight chain hydrocarbon group having between 7 and 22 carbon atoms and their water soluble acid addition salts, conditioning the resulting reagentized slurry, subjecting the conditioned slurry to froth flotation, and recovering the non-floated fraction containing purified potassium hydroxide.

5. A process for the purification of potassium hydroxide containing potassium chloride as an impurity which comprises preparing a solution saturated with respect to the potassium hydroxide solution at a temperature between about 45° C. and about 55° C., separating insoluble potassium chloride from said solution, adding the resulting solution to a slurry containing solid phase potassium hydroxide dihydrate while maintaining the temperature of the resulting combined slurry between about 28° C. and about 32° C., reagentizing the resulting potassium hydroxide dihydrate slurry with an aqueous methanol solution containing a collecting agent selected from the group consisting of primary aliphatic amines containing a straight chain hydrocarbon group having between 7 and 22 carbon atoms and their water soluble acid addition salts, conditioning the reagentized slurry, subjecting the conditioned slurry to froth flotation, and recovering the non-floated fraction containing purified potassium hydroxide.

6. A process for the purification of potassium hydroxide containing potassium chloride as impurity which comprises preparing a solution substantially saturated with respect to the potassium hydroxide monohydrate at a temperature between about 45° C. and about 55° C., separating insoluble potassium chloride from said solution, adding the resulting solution to a slurry containing crude solid phase potassium hydroxide dihydrate while maintaining the temperature of the resulting combined slurry between about 28° C. and about 32° C., reagentizing the resulting potassium hydroxide dihydrate slurry with an aqueous methanol solution containing a collecting agent selected from the group consisting of primary aliphatic amines containing a straight chain hydrocarbon group having between 7 and 22 carbon atoms and their water soluble acid addition salts and between about 5% and about 80% by weight of methanol, conditioning the reagentized slurry, subjecting the conditioned slurry to froth flotation, and recovering the non-floated fraction containing purified potassium hydroxide.

7. A process for the purification of potassium hydroxide containing potassium chloride as an impurity which comprises crystallizing potassium hydroxide as the dihydrate at a temperature between about 28° C. and about 32° C., reagentizing the dihydrate slurry with an aqueous methanol solution of a collecting agent comprising an acetate of primary aliphatic amines containing a straight chain hydrocarbon group having between 7 and 22 carbon atoms, conditioning the reagentized slurry, subjecting the conditioned slurry to froth flotation, and recovering the non-floated fraction containing purified potassium hydroxide.

8. A process for the purification of an impure potassium hydroxide solution produced by electrolysis of an aqueous solution of potassium chloride which comprises concentrating said potassium hydroxide solution at a temperature between about 85° C. and about 95° C. to such point that upon cooling to between about 45° C. and about 55° C. the cooled solution is substantially saturated with respect to potassium hydroxide monohydrate, cooling the concentrated solution, separating solid potassium chloride from the cooled solution, crystallizing potassium hydroxide dihydrate from the resulting solution at a temperature between about 28° C. and about 32° C., reagentizing the resulting slurry containing potassium hydroxide dihydrate with an aqueous methanol solution containing a collecting agent selected from the group consisting of primary aliphatic amines containing a straight chain hydrocarbon group having between 7 and 22 carbon atoms and their water soluble acid addition salts, conditioning the reagentized slurry, subjecting the conditioned slurry to froth flotation, and recovering the non-floated fraction containing purified potassium hydroxide.

9. A process for the purification of an impure potassium hydroxide solution produced by electrolysis of an aqueous solution of potassium chloride which comprises concentrating said potassium hydroxide solution at a temperature between about 85° C. and about 95° C. to such point that upon cooling to between about 45° C. and about 55° C. the cooled solution is substantially saturated with respect to potassium hydroxide monohydrate, cooling the concentrated solution, separating solid potassium chloride from the cooled solution, adding the concentrated potassium hydroxide solution to a slurry containing potassium hydroxide dihydrate, maintaining the resulting slurry containing potassium hydroxide dihydrate at a temperature between about 28° C. and about 32° C. while adding the solution, reagentizing the resulting potassium hydroxide dihydrate slurry with a collecting agent dissolved in an aqueous solution of methanol, said collecting agent being selected from the group consisting of primary aliphatic amines containing a straight chain hydrocarbon group having between 7 and 22 carbon atoms and their water soluble acid addition salts, the quantity of reagent used ranging between about 0.05 pound and about 0.50 pound per ton of feed, conditioning the reagentized slurry, subjecting the conditioned slurry to froth flotation, and recovering the non-floated fraction containing purified potassium hydroxide.

10. A process for the purification of an impure potassium hydroxide solution produced by electrolysis of an aqueous solution of potassium chloride which comprises concentrating said potassium hydroxide solution at a temperature between about 85° C. and about 95° C. to such point that upon cooling to between about 45° C. and about 55° C. the cooled solution is substantially saturated with respect to potassium hydroxide monohydrate, cooling the concentrated solution, separating solid potassium chloride from the cooled solution, adding the concentrated potassium hydroxide solution to a slurry containing potassium hydroxide dihydrate, maintaining the resulting slurry containing potassium hydroxide dihydrate at a temperature between about 28° C. and about 32° C. while adding the solution, reagentizing the resulting potassium hydroxide dihydrate slurry with a collecting agent dissolved in an aqueous solution of ethanol, said collecting agent being selected from the group consisting of primary aliphatic amines containing a straight chain hydrocarbon group having between 7 and 22 carbon atoms and their water soluble acid addition salts, the quantity of reagent used ranging between about 0.05 pound and about 0.50 pound per ton of feed, conditioning the reagentized slurry, subjecting the conditioned slurry to froth flotation, and recovering the non-floated fraction containing purified potassium hydroxide.

11. A process for the purification of impure potassium hydroxide solution produced by electrolysis of an aqueous solution of potassium chloride which comprises concentrating said potassium hydroxide solution at a temperature between about 85° C. and about 95° C. to such a point that upon cooling to between about 45° C. and about 55° C. the cooled solution is substantially saturated with respect to potassium hydroxide monohydrate, cooling the concentrated solution to between about 45° C. and about 55° C., separating potassium chloride from the resulting slurry, adding the concentrated potassium hydroxide solution to a cooled slurry of crude potassium hydroxide dihydrate in a crystallization system at a temperature between about 28° C. and about 32° C., reagentizing the crude potassium hydroxide slurry with between about 0.05 pound and 0.50 pound of collector reagent per ton of slurry, said collecting reagent comprising an acetate of a primary aliphatic amine containing a straight chain hydrocarbon group having between 7 and 22 carbon atoms, dissolved in an aqueous solution containing between about 5% and about 80% methanol, conditioning the reagentized slurry, subjecting the conditioned slurry to froth flotation, and recovering the non-floated fraction containing purified potassium hydroxide.

No references cited.